United States Patent
Lin et al.

(10) Patent No.: US 9,092,221 B2
(45) Date of Patent: Jul. 28, 2015

(54) TOUCH DISPLAY DEVICE

(75) Inventors: Hanwen Lin, Zhangpu (CN); Yueling Chen, Longhai (CN)

(73) Assignee: TPK Touch Systems (Xiamen) Inc., Xiamen (CN)

(*) Notice: Subject to any disclaimer, the term of this patent is extended or adjusted under 35 U.S.C. 154(b) by 119 days.

(21) Appl. No.: 13/559,560

(22) Filed: Jul. 26, 2012

(65) Prior Publication Data

US 2013/0113727 A1    May 9, 2013

(30) Foreign Application Priority Data

Nov. 4, 2011    (CN) .......................... 2011 1 0361856

(51) Int. Cl.
*G06F 3/041*    (2006.01)
*G06F 3/038*    (2013.01)
*G06F 1/00*    (2006.01)
*G06F 1/32*    (2006.01)

(52) U.S. Cl.
CPC ............ *G06F 1/3262* (2013.01); *G06F 1/3287* (2013.01); *Y02B 60/1282* (2013.01)

(58) Field of Classification Search
USPC .................................. 345/173; 713/300–340
See application file for complete search history.

(56) References Cited

U.S. PATENT DOCUMENTS

| | | | |
|---|---|---|---|
| 5,204,813 A | 4/1993 | Samph et al. | |
| 5,396,443 A * | 3/1995 | Mese et al. | 713/321 |
| 5,553,296 A * | 9/1996 | Forrest et al. | 713/323 |
| 5,790,875 A * | 8/1998 | Andersin et al. | 713/320 |
| 6,901,273 B2 * | 5/2005 | Lutnaes | 455/566 |
| 7,353,413 B2 * | 4/2008 | Dunstan | 713/320 |
| 2005/0022039 A1* | 1/2005 | Inui et al. | 713/300 |
| 2005/0289363 A1* | 12/2005 | Tsirkel et al. | 713/300 |
| 2011/0256848 A1* | 10/2011 | Bok et al. | 455/411 |
| 2013/0241295 A1* | 9/2013 | Cheng et al. | 307/80 |

* cited by examiner

*Primary Examiner* — Temesgh Ghebretinsae
*Assistant Examiner* — Benyam Ketema
(74) *Attorney, Agent, or Firm* — Gokalp Bayramoglu

(57) ABSTRACT

The present disclosure relates to an input and output device, and more particularly to a touch display device. The touch display device comprises a display panel, a touch controller, and a power supplier. The display panel performs an image display operation in a display state. The touch controller performs a touch controlling operation in a working state. The power supplier is coupled to the touch controller and provides an operation voltage to the touch controller. When the display panel is in a non-display state, the power supplier is enabled not to provide the operation voltage to the touch controller such that the touch controller comes in a non-working state.

12 Claims, 4 Drawing Sheets

TOUCH DISPLAY DEVICE

This application claims the benefit of Chinese application No. 201110361856.8, filed on Nov. 4, 2011.

BACKGROUND OF THE INVENTION

1. Field of the Related Art

The present disclosure relates to an input and output device, more particularly to a touch display device.

2. Description of the Related Art

FIG. 1 shows a conventional touch display device. As shown in FIG. 1, a touch display device 1 comprises a display panel 10, a processor 11, a power switch 12, a touch sensor 13, a touch controller 14, and an I/O port 15. The touch display device 1 is contacted with an external host 16 through the I/O port 15 and supplied power via an external power circuit (not shown). Transmission of data between the host 16 and the processor 11 is performed through the I/O port 15. Moreover, the touch controller 14 receives an operation voltage +5V from the host 16 through the I/O port 15 so as to make the touch controller 14 to be in working state.

The "on" and "off" mode of the display panel 10 is controlled by the processor 11 connected to the power switch 12, while the operation voltage of the touch controller 14 is provided by the power source +5V through the I/O port 15, and therefore the display panel 10 does not show any image when it is turned off by users via the power switch 12. While, the 110 port 15 still provides the touch controller 14 with operation voltage +5V to let it be in the working state. Therefore, even when the display panel 10 is off, if any user or any object carelessly/mistakenly touches the touch sensor 13, the touch controller 14 performs a touch control operation to make the processor 11 transmit data with the host 16. In this case, the host 16 may perform undesired programs or operations, resulting in system disorder.

Therefore, there is a need of a touch display device that closes a touch controller while the display panel is off to avoid performance of undesired programs or operations by the host connected to the touch display device when the display panel is off and if the touch sensor is mistakenly touched.

SUMMARY OF THE INVENTION

An objective of the present disclosure is to provide a touch display device, wherein a power supplier is enabled not to provide an operation voltage to a touch controller when a display panel is in a non-display state, so as to let the touch controller be in a non-working state, thus avoiding performance of undesired programs or operations by a host when the display panel is in the non-display state and the touch sensor is mistakenly touched.

The present disclosure provides a touch display device, comprising: a display panel performing an image display operation in a display state; a touch controller performing a touch control operation in a working state; and a power supplier coupled to the touch controller and providing an operation voltage to the touch controller, wherein when the display panel is in a non-display state, the power supplier is enabled not to provide the operation voltage to the touch controller, such that the touch controller is in a non-working state.

The touch display device of the present disclosure further comprises a power switch and a processor. The power switch is switched between a turn-on state and a turn-off state, and the processor detects the state of the power switch and controls the display panel and the power supplier according to the state of the power switch. When the processor detects that the power switch is in the turn-on state, it controls the power supplier to provide the operation voltage to the touch controller, making the touch controller to be in a working state.

For the touch display device provided in the present disclosure, the processor closes the touch controller while the display panel is off so as to avoid performance of undesired programs or operation by the host connected to the touch display device when the display panel is off and the touch sensor is mistakenly touched.

BRIEF DESCRIPTION OF THE DRAWINGS

For those skilled in the art to understand this disclosure, numerous embodiments combined with drawings described below are for illustration purpose only and do not limit the scope of the present disclosure in any manner.

DETAILED DESCRIPTION OF THE EMBODIMENTS

A touch display device, according to one embodiment of the present disclosure is described below. However, it can be easily understood that the embodiment provided by the present disclosure is only for describing the method of manufacturing, using, and working of the present disclosure and is not intended to limit the scope of the present disclosure.

Figure 1:
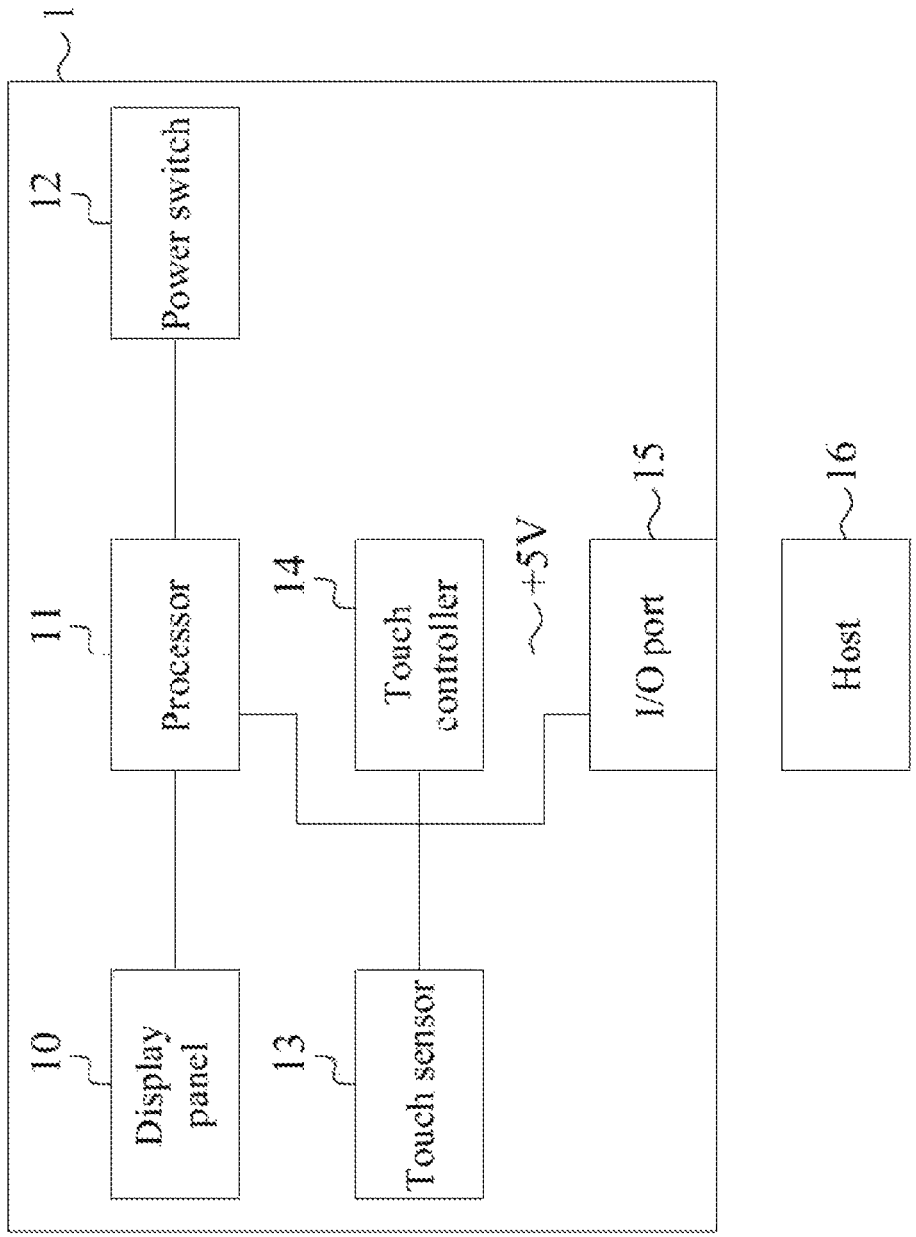
FIG. 1 shows a conventional touch display device.
Figure 2:
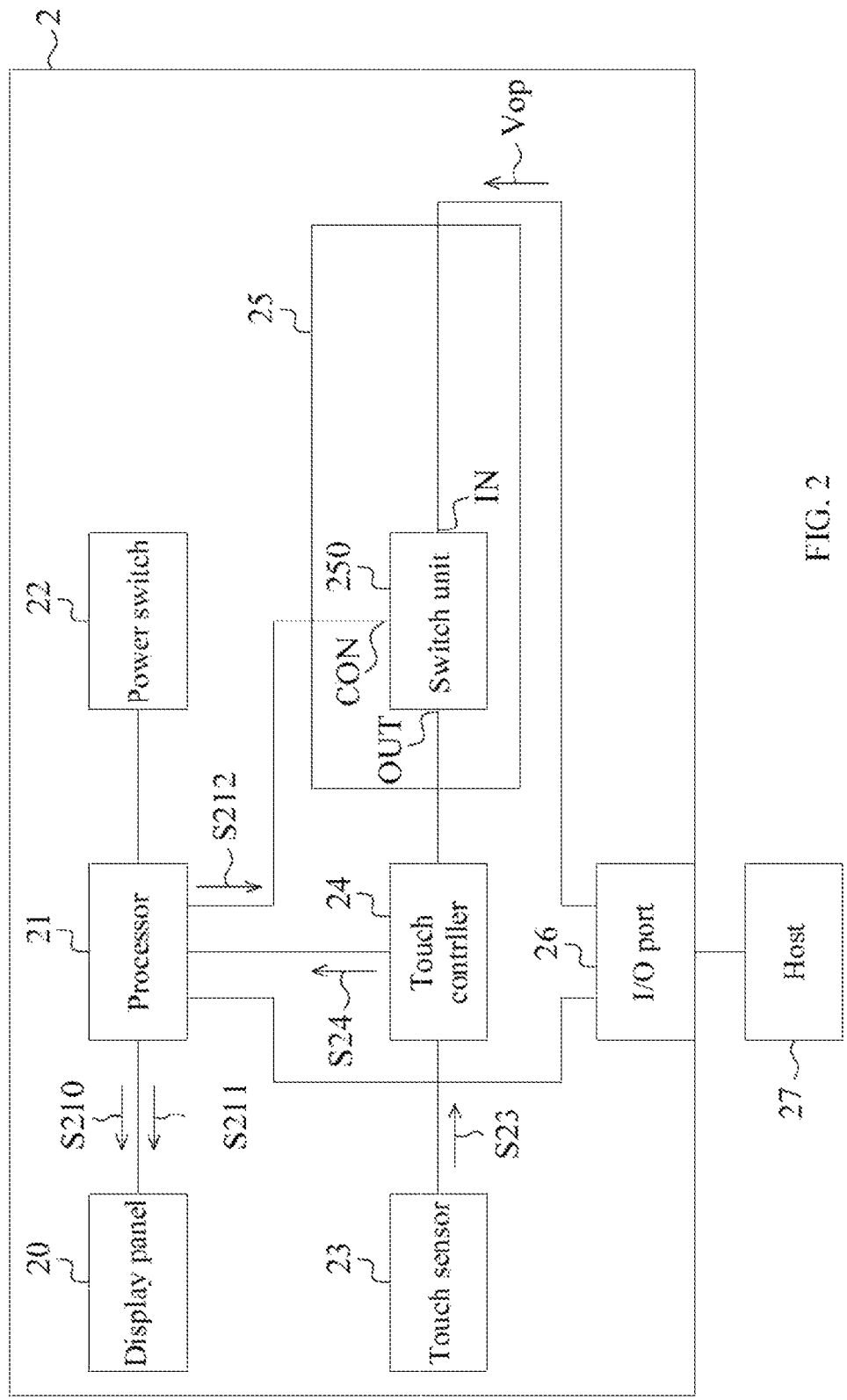
FIG. 2 illustrates a touch display device in accordance with an embodiment of the present disclosure.

FIG. 2 illustrates a touch display device according to an embodiment of the present disclosure. In the present embodiment, a touch display device 2 has a number of display functions and touch functions. As shown in FIG. 2, the touch display device 2 comprises a display panel 20, a touch controller 24 and a power supplier 25. The display panel 20 performs an image display operation corresponding to the display function in a display state, thereby enabling to display images. The touch controller 24 performs a touch control operation in a working state. The power supplier 25 coupled to the touch controller 24, provides an operation voltage to the touch controller 24. When the display panel 20 is in a non-display state, the power supplier 25 is enabled not to provide the touch controller 24 with the operation voltage to make the touch controller 24 be in a non-working state. Therefore, the touch controller 24 is also closed to avoid performance of the touch control operation when mistakenly touched while the display panel is in the non-display state.

In an embodiment of the present disclosure, a touch display device 2 further comprises a processor 21, a power switch 22, a touch sensor 23, and an I/O port 26. The touch display device 2 contacts with a host 27 by connection through the I/O port 26. A signal transmission between the touch display device 2 and the host 27 is performed through the I/O port 26. The processor 21 can receive signals from the host 27 through the I/O port 26. When the display panel 20 is in the display state, the processor 21 generates a display control signal S210 according to the signals from the host 27 to control the display panel 20 to perform the image display operations such as the change or the determination of images displayed by the display panel 20.

The touch sensor 23, which is disposed on the front of the display panel 20, is used for sensing touches on the touch display device 2 and generating a plurality of sensing signals S23. The touch controller 24 performs a touch control operation corresponding to the touch function in the working state. Specifically, the touch controller 24 is associated with the touch sensor 23 to receive sensing signals S23 and then acquire a touch condition of the touch sensor 23 based on the sensing signals S23. For instance, the touch controller 24 acquires the determination of whether the touch sensor 23 is touched or not, or/and the position or coordinate of an object on the touch sensor 23 when the touch sensor 23 is touched by the object. Moreover, the touch controller 24 performs touch control operation to generate touch result signals S24 to the processor 21.

The processor 21 generates display control signals S210 based on the touch result signals S24 from the touch controller 24 as well as based on signals from the host 27, thereby controlling the display panel 20 to perform the image display operation. As illustrated below, under the situation of the display panel 20 being in a display state, the touch controller 24 being in a working state, and the touch sensor 23 being touched by an object, the touch controller 24 is informed that the touch sensor 23 is touched by the object according to the sensing signals S23 and as a result generates corresponding touch result signals S24. The processor 21 is associated with the host 27 through the I/O port 26 and responds the touch result signals S24 to the host 27, resulting in performance of corresponding programs or operations of the host 27. Based on the performance of the programs or operations, the host 27 sends feedback signals to the processor 21. The processor 21 generates the display control signals S210 based on the touch result signals S24 and based on the feedback signals from the host 27 to control the display panel 20 during performance of the image display operation, thereby changing or determining the images shown by the display panel 20. For instance, the processor 21 controls the display panel 20 to switch and show new images through the display control signals S210.

As shown in FIG. 2, the power supplier 25 receives the operation voltage Vop from the host 27 through the I/O port 26. The operation voltage Vop can serve as the voltage applied by the touch controller 24. In an embodiment of the present disclosure, the operation voltage Vop is +5V with a high voltage level. The power supplier 25 comprises a switch unit 250 that further comprises a control terminal CON, an input terminal IN, and an output terminal OUT. The input terminal IN of the switch unit 250 receives the operation voltage Vop and the output terminal OUT is coupled to the touch controller 24.

Further, the power switch 22 switches between a turn-on state and a turn-off state, which is used to control the display panel 20 in a display state or in a non-display state. The processor 21 can detect the state of the power switch 22 and generate a state-switched signal S211 to the display panel 20 and a switch signal S212 to the control terminal CON of the switch unit 250 according to the detection results.

Further, when the processor 21 detects the turn-on state of the power switch 22, the processor 21 controls the display panel 20 in a display state through the state-switched signal S211, making the display panel 20 show images in accordance with display control signals S210. The processor 21 also enables a switch signal S212. In the embodiment, the switch signal S212 has a high voltage level. The switch unit 250, in this mode, transmits the operation voltage Vop from the input terminal IN to the output terminal OUT in accordance with the switch signals S212, thereby providing the operation voltage Vop to the touch controller 24 and making the touch controller 24 to be in the working state based on the operation voltage Vop. The display panel 20 normally performs image display operation and the touch controller 24 can be associated with the touch sensor 23 to perform the touch control operation normally due to the existence of the display panel 20 in a display state and the existence of the touch controller 24 in a working state.

Further, in an embodiment of the present disclosure, when the processor 21 detects that the power switch 22 is in the turn-off state, the processor 21 controls the display panel 20 to be in non-display state through the state-switched signals S211, making the display panel not to show images. At the moment, the processor 21 disables the switch signals S212. In the present embodiment, the switch signal S212 has a low-voltage level. The switch unit 250, in this mode, cannot transmit the operation voltage Vop from the input terminal IN to the output terminal OUT based on the switch signals S212. Due to the lack of driving voltage to the touch controller 24, the touch controller 24 is in a non-working state, as a result of which, the touch controller 24 stops the association with the touch sensor 23 as the touch controller 24 in the non-working state. Therefore, the touch controller 24 does not perform the touch control operation and does not generate corresponding touch result signals S24 to the processor 21. Therefore, when an object touches the touch sensor 23, the processor 21 will not conduct operation as there is no touch result signal generated, thus not resulting system disorder of the host 27.

Figure 3:
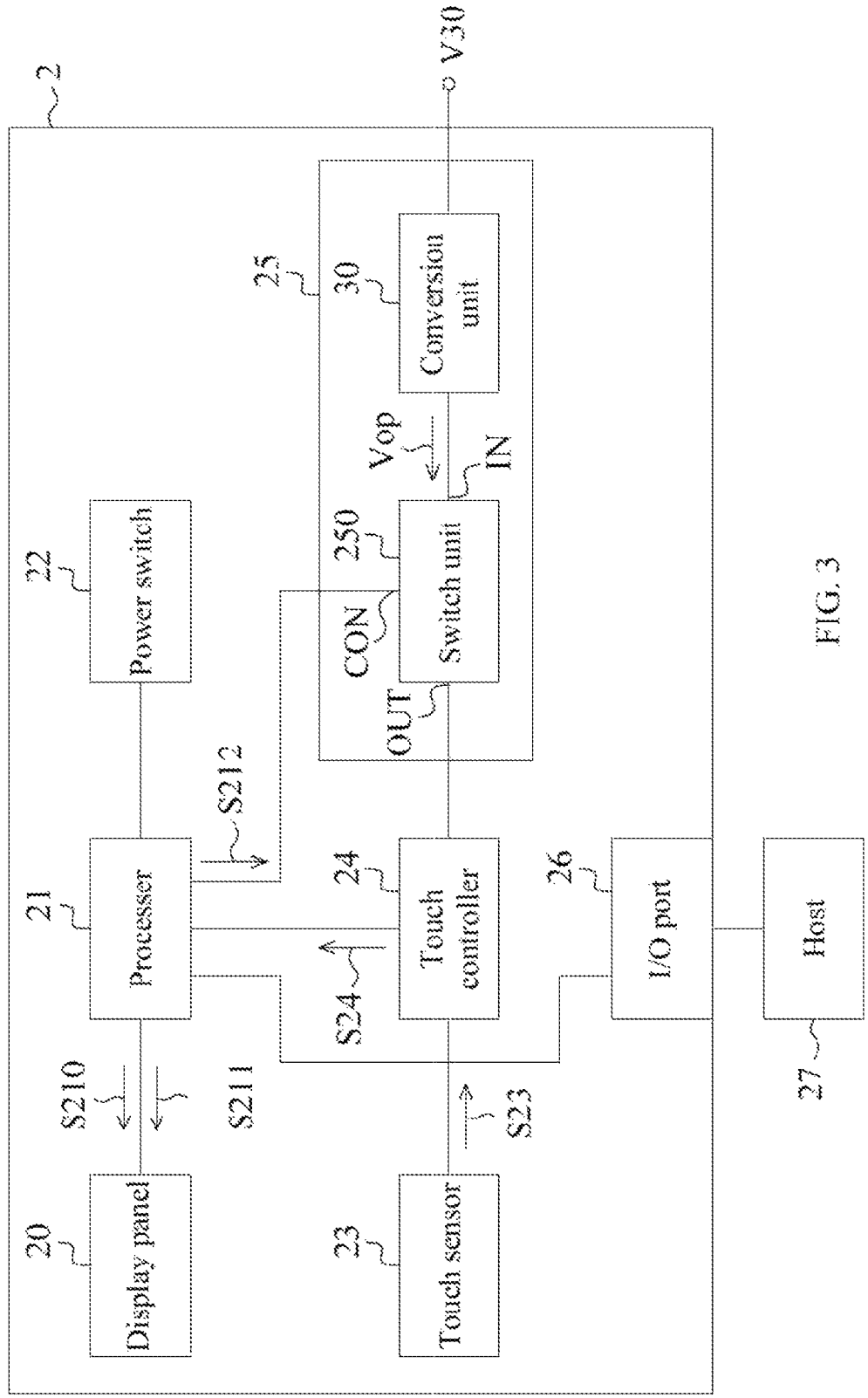
FIG. 3 illustrates a touch display device in accordance with another embodiment of the present disclosure.

FIG. 3 is a touch display device according to another embodiment of the present disclosure. As shown in FIG. 2 and FIG. 3, the same components can be marked with the same symbols. The difference of the touch display device in FIG. 2 and the touch display device in FIG. 3 is that in FIG. 3, the power supplier 25 does not receive the operation voltages Vop from the host 27 through the I/O port 26. In the embodiment of FIG. 3, the I/O port 26 is only used for signal transmission between the touch display device 2 and the host 27. In the embodiment of FIG. 3, the power supplier 25 further comprises a conversion unit 30 that receives an external power voltage V30 and converts the voltage V30 to the operation voltage Vop. In the embodiment, the external power voltage V30 can be an alternative current voltage of +110V or +220V. The conversion unit 30 transmits the operation voltage Vop acquired via conversion to the input terminal IN of the switch unit 250.

Figure 4:
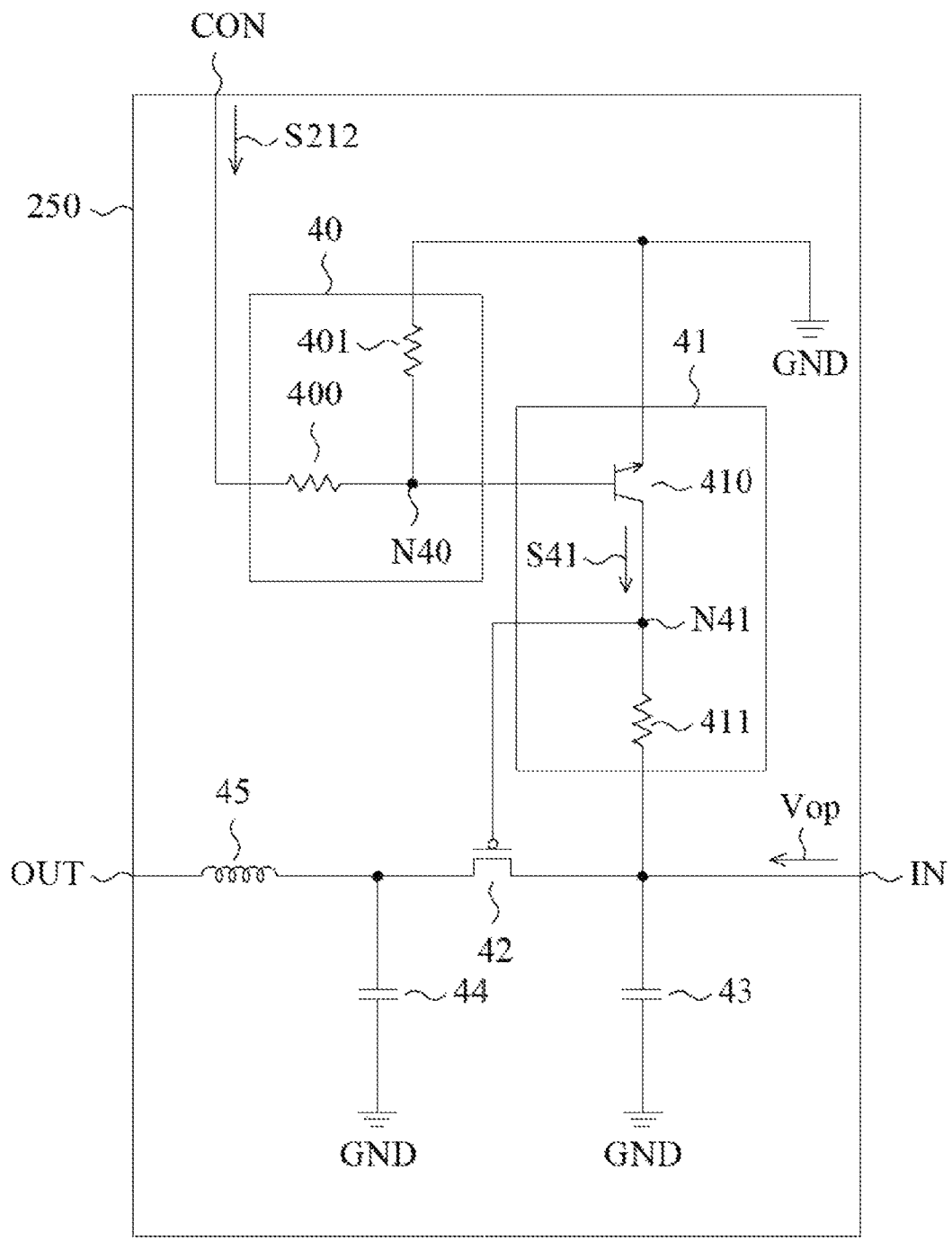
FIG. 4 illustrates a switch unit in accordance with an embodiment of the present disclosure.

FIG. 4 is a switch unit 250 in accordance with an embodiment of the present disclosure. As shown in FIG. 4, the switch unit 250 comprises a voltage divided and current limited unit 40, a buffer unit 41, a transistor 42, filter capacitors 43-44, and a filter inductor 45. The voltage divided and current limited unit 40 comprises resistors 400 and 401, wherein the resistor 400 is coupled between the control terminal CON of the switch unit 250 and the node N40. The resistor 401 is coupled between the node point N40 and reference grounding GND that has a low voltage level.

The buffer unit 41 comprises a transistor 410 and a resistor 411, and the buffer unit 41 generates a buffer output signal S41. In an embodiment of the present disclosure, the transistor 410 is a NPN bipolar transistor. The base of the transistor 410 (the control terminal) is coupled to the node N40, the collector (the input terminal) is coupled to the node N41, and the emitter (the output terminal) is coupled to the reference grounding GND. The resistor 411 is coupled between the node point N41 and the input terminal IN of the switch unit 250. The buffer output signal S41 is generated on the node N41.

In an embodiment of the present disclosure, the transistor 42 is a P-Mosfet transistor. Gate of the transistor 42 (the control terminal) is coupled to the node N41, drain terminal (the input terminal) is coupled to the input terminal IN of the switch unit 250, and source is coupled to the output terminal OUT of the switch unit 250 through the filter inductor 45. The filter capacitor 43 is coupled between the input terminal IN of the switch unit 250 and the reference grounding GND. The filter capacitor 44 is coupled between the source of the transistor 42 and the reference grounding GND.

In an embodiment of the present disclosure, when the processor 21 detects that the power switch is in the turn-on state, the processor 21 enables the switch signals S212. As mentioned above, in this state, the switch signals S212 have a high voltage level, and therefore the transistor 410 is conductive in accordance with the switch signals S212 of high voltage level. Further, in this state, the buffer output signals S41 on the node N41 have a low voltage level. The transistor 42 is conductive in accordance with the buffer output signals S41 of low voltage level. The operation voltage Vop from the input terminal IN of the switch unit 250 is transmitted to the output terminal OUT of the switch unit 250 through the conduction of the transistor 42 and the filter inductor 45. Therefore, the touch controller 24 receives the operation voltage Vop and is in working state.

In another embodiment of the present disclosure, when the processor 21 detects that the power switch is in the turn-off state, the processor 21 disables the switch signals S212. In this case, the switch signals S212 have a low voltage level. Therefore, the transistor 410 is closed according to the switch signals S212 of low voltage level. Further, in this case, the buffer output signals S41 on the node point N41 have a high voltage level in accordance with the operation voltage Vop from the input terminal IN of the switch unit 250. The transistor 42 is closed according to the buffer output signal S41 of high voltage level. The operation voltages Vop, from the input terminal IN of the switch unit 250, are not transmitted to the output terminal OUT. As there is no operation voltage Vop, the touch controller 24 is in a non-working state.

While certain embodiments have been shown and described, various modifications and substitutions may be made thereto without departing from the spirit and scope of the disclosure. Therefore, it is to be understood that the present disclosure has been described by way of illustration and not limitations.

What is claimed is:

1. A touch display device, comprising:
a display panel performing an image display operation in a display state;
a touch controller performing a touch control operation in a working state; and
a power supplier coupled to the touch controller and configured to provide an operation voltage to the touch controller;
a power switch for switching between a turn-on state and a turn-off state; and
a processor detecting state of the power switch and controlling the display panel and the power supplier based on the state of the power switch;
wherein the power supplier comprises a switch unit with a control terminal receiving a switch signal from the processor, an input terminal receiving the operation voltage and an output terminal coupled to the touch controller:
wherein when the processor detects that the power switch is in the turn-off state, the processor disables the switch signal to control the switch unit not to transmit the operation voltage to the output terminal of the switch unit such that the touch controller is in the non-working state; and wherein when the processor detects that the power switch is in the turn-on state the processor enables the switch signal to control the switch unit to transmit the operation voltage to the output terminal of the switch unit such that the touch controller receives the operation voltage and is in the working state; and wherein the switch unit comprises:
a voltage divided and current limited circuit coupled to the control terminal of the switch unit;
a buffer circuit receiving the switch signal through the voltage divided and current limited circuit and generating a buffer output signal based on the switch signal; and
a first transistor comprising a control terminal receiving the buffer output signal, an input terminal coupled to the input terminal of the switch unit and an output terminal coupled to the output terminal of the switch unit;
wherein when the processor enables the switch signal reversely, the buffer circuit generates the buffer output signal to close the first transistor; and
wherein when the processor enables the switch signal, the buffer circuit generates the buffer output signal to turn on the first transistor.

2. The touch display device of claim 1, wherein the voltage divided and current limited circuit comprises:
a first resistor coupled between the control terminal of the switch unit and a first node; and
a second resistor coupled between the first node and reference grounding; and
wherein the buffer circuit comprises:
a second transistor comprising a control terminal coupled to the first node, an input terminal coupled to a second node and an output terminal coupled to the reference grounding; and
a third resistor coupled between the second node and the input terminal of the switch unit, wherein the buffer output signal is generated on the second node.

3. The touch display device of claim 1, wherein the switch unit further comprises:
a first capacitor coupled between the input terminal of the switch unit and the reference grounding;
a second capacitor coupled between the output terminal of the first transistor and the reference grounding; and
an inductor coupled between the output terminal of the first transistor and the output terminal of the switch unit.

4. The touch display device of claim 1, wherein the first transistor is a P-Mosfer transistor and the second transistor is a NPN bipolar transistor.

5. The touch display device of claim 1, further comprising an I/O port, wherein the power supplier receives the operation voltage through the I/O port.

6. The touch display device of claim 5, wherein the touch display device is connected to a host through the I/O port to receive the operation voltage from the host and to transmit data to the host.

7. The touch display device of claim 1, wherein the power supplier comprises:
a conversion unit receiving an external power voltage and converting the external power voltage to the operation voltage.

8. The touch display device of claim 7, further comprising an I/O port, wherein the touch display device is connected to a host through the I/O port for data transmission with the host.

9. The touch display device of claim 1, further comprising:
a touch sensor sensing a touch on the touch display device and generating a plurality of sensor signals;
wherein when the processor detects that the power switch is in the turn-on state, the touch controller is in the working state and performs the touch control operation to generate a touch result signal based on the sensor signals; and wherein when the processor detects that the power switch is in the turn-off state, the touch controller is in the non-working state and does not perform the touch control operation.

10. The touch display device of claim 9, wherein when the touch controller is in the working state, the touch controller performing the touch control operation is acquiring a touch condition of the touch sensor based on the sensor signals and then generates the touch result signal to the processor based on the touch condition.

11. The touch display device of claim 9, wherein when the processor detects that the power switch is in the turn-on state, the processor controls the display panel in the display state and controls the display panel to perform the image display operation based on the touch result signal.

12. The touch display device of claim 9, wherein when the processor detects that the power switch is in the turn-off state, the processor controls the display panel in the non-display state and then the touch display does not display images.

\* \* \* \* \*